United States Patent
Huang (10) Patent No.: US 9,823,505 B2
(45) Date of Patent: Nov. 21, 2017

(54) COLOR FILTER SUBSTRATE, LIQUID CRYSTAL DISPLAY PANEL, AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventor: Zhongshou Huang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 25 days.

(21) Appl. No.: 14/815,819

(22) Filed: Jul. 31, 2015

(65) Prior Publication Data

US 2016/0131940 A1 May 12, 2016

(30) Foreign Application Priority Data

Nov. 10, 2014 (CN) .......................... 2014 1 0628875

(51) Int. Cl.
G02F 1/1335 (2006.01)
G02F 1/1337 (2006.01)
G02B 5/20 (2006.01)

(52) U.S. Cl.
CPC .. *G02F 1/133514* (2013.01); *G02F 1/133512* (2013.01); *G02F 1/133784* (2013.01); *G02B 5/201* (2013.01)

(58) Field of Classification Search
CPC ......... G02F 1/133514; G02F 1/133512; G02F 1/133784; G02F 1/133509; G02F 2201/14; G02B 5/201

(Continued)

(56) References Cited

U.S. PATENT DOCUMENTS

2011/0189599 A1* 8/2011 Sumino ................. G02B 5/201
430/7

FOREIGN PATENT DOCUMENTS

CN   1860407 A   11/2006
CN   1930499 A   3/2007

(Continued)

OTHER PUBLICATIONS

English translation of CN102830587, assignee BOE Technology Group Co., Ltd., et al, published Dec. 19, 2012; translation downloaded from Google Patents on Dec. 19, 2016, translation provided by said website.*

(Continued)

*Primary Examiner* — Angela Davison
(74) *Attorney, Agent, or Firm* — Alston & Bird LLP (57) ABSTRACT

The present invention discloses a color filter substrate, a liquid crystal display panel, and a display device so as to lower step differences between color-resists and light shielding strips on the color filter substrate to thereby avoid non-uniform rubbing or the color-resist layer being broken while an orientation layer is being rubbed for orientation from occurring due to the step differences, thus avoiding non-uniformity of brightness and hence improving a quality of display. The color film substrates includes a plurality of color-resists arranged spaced from each other, and light shielding strips arranged in gaps between every two adjacent color-resists, wherein the respective color-resists and the light shielding strips adjacent thereto overlap in respective overlap areas each including a plurality of teeth-shaped structures, and a distance between tops of two adjacent ones of the teeth-shaped structures is less than twenty times a thickness of the light shielding strip.

12 Claims, 8 Drawing Sheets

(58) Field of Classification Search
USPC .................................. 349/106, 110, 126, 111
See application file for complete search history.

(56) References Cited

FOREIGN PATENT DOCUMENTS

| CN | 101303502 A | 11/2008 |
|----|-------------|---------|
| CN | 102830587 A | 12/2012 |
| JP | H09105809 A | 4/1997  |
| KR | 20070079645 A | 8/2008 |

OTHER PUBLICATIONS

English transmation of CN 102830587, assignee BOE Technology Group Co., Ltd. et al, published Dec. 19, 2012; translation downloaded from Google Patents https://patents.google.com on Dec. 19, 2016, translation provided by said website.*

* cited by examiner

COLOR FILTER SUBSTRATE, LIQUID CRYSTAL DISPLAY PANEL, AND DISPLAY DEVICE

CROSS-REFERENCES TO RELATED APPLICATIONS

This application claims priority to Chinese patent application No. 201410628875.6, filed Nov. 10, 2014, the content of which is incorporated herein by reference in its entirety.

TECHNICAL FIELD

The present invention relates to the field of liquid crystal displays and particularly to a color filter substrate, a liquid crystal display panel, and a display device.

BACKGROUND OF THE INVENTION

Figure 1:
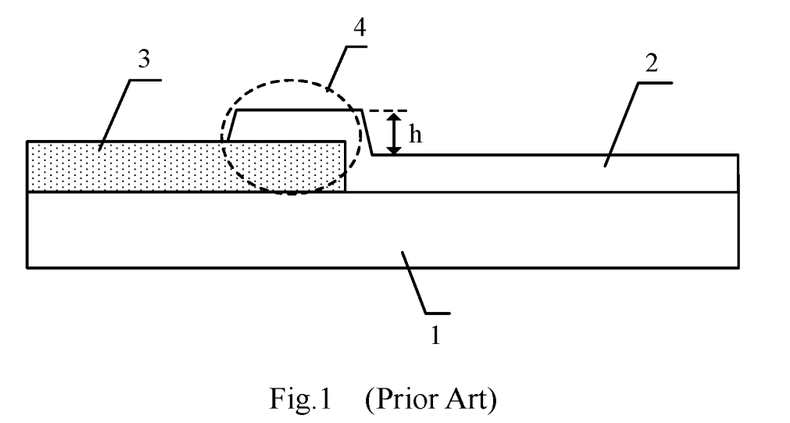
FIG. 1 illustrates a schematic structural diagram of a color filter substrate in the reference in a sectional view.

A Color Filter (CF) substrate is a component necessary to a liquid crystal display panel. The CF substrate includes color-resists in red, green and blue typically made of color resins with the color-resists in the different colors being arranged spaced from each other. In order to prevent light from being leaked, light shielding strips are further arranged in gaps between the adjacent color-resists. FIG. 1 illustrates a schematic diagram of the existing CF substrate in a sectional view including a base substrate 1, color-resists 2, and light shielding strips 3 which overlap with the color-resists 2 in respective overlap areas 4; and the CF substrate is manufactured by firstly manufacturing the light shielding strips 3 through a first exposure operation and then manufacturing the color-resists 2 in red, green and blue through sequential exposure operations. However there may be differences in height h, referred to as step differences, between the tops of the color-resists 2, which overlie the edges of the light shielding strips 3, and the tops of the color-resists 2, which do not overlie the light shielding strips 3, in the overlap areas 4.

The CF substrate needs to be manufactured by forming an orientation layer over the respective color-resists 2 above (not illustrated). In order to generate a pre-inclination angle of liquid crystal molecules in the liquid crystal display panel into which the CF substrate and an array substrate are assembled, the orientation layer on the CF substrate needs to be rubbed, but the surface of the orientation layer may be roughened due to the step differences between the color-resists 2 and the light shielding strips 3 overlapping therewith, thus resulting in non-uniform rubbing, and even breaking the color-resist layer, in respective zones with the step differences of the orientation layer being rubbed, so that the liquid crystal molecules in the liquid crystal display panel in proximity to the respective zones with the step differences cannot be aligned normally, thus resulting in non-uniform brightness and hence degrading the quality of display on the liquid crystal display panel.

BRIEF SUMMARY OF THE INVENTION

An object of the present invention is to provide a color filter substrate, a liquid crystal display panel, and a display device so as to lower step differences between color-resists and light shielding strips on the color filter substrate and to avoid non-uniform rubbing or the color-resist layer being broken while an orientation layer is being rubbed for orientation from occurring due to the step differences.

An embodiment of the present invention provides a color filter substrate including:
a plurality of color-resists arranged spaced from each other, and light shielding strips arranged in gaps between every two adjacent color-resists, wherein the respective color-resists and light shielding strips adjacent thereto overlap in respective overlap areas each including a plurality of teeth-shaped structures, and a distance between tops of every two adjacent ones of the teeth-shaped structures is less than twenty times a thickness of the light shielding strips.

Advantageous effects of the embodiment of the present invention are as follows: when the color-resists and the light shielding strips of the color filter substrate overlap in the respective areas each including the plurality of teeth-shaped structures with the distance between the tops of every two adjacent teeth-shaped structures being less than twenty times the thickness of the light shielding strips, the average step difference from a non-overlap area to an overlap area or from the overlap areas to the non-overlap areas varies slowly during an oriented rubbing process, thus making rubbing uniform and alleviating the color-resist film layer from being broken in the overlap areas; and further the brightness of display on the display device can be made uniform to thereby improve the quality of display thereof.

An embodiment of the present invention provides a liquid crystal display panel including the color filter substrate above.

An embodiment of the present invention provides a display device including the liquid crystal display panel above.

DETAILED DESCRIPTION OF THE PREFERRED EMBODIMENTS

Implementations of the embodiments of the present invention will be described below in details with reference to the drawings. It shall be noted that identical or similar reference numerals will denote identical or similar elements or functionally identical or similar elements throughout the drawings. The embodiments described below with reference to the drawings are illustrative and merely intended to explain the present invention but shall not be construed as limiting the present invention.

An embodiment of the present invention provides a color filter substrate including a plurality of color-resists arranged spaced from each other, and light shielding strips arranged in gaps between every two adjacent color-resists, wherein the respective color-resists and light shielding strips adjacent thereto overlap in respective overlap areas each including a plurality of teeth-shaped structures, and the distance between the tops of every two adjacent teeth-shaped structures is less than twenty times the thickness of the light shielding strips.

In this embodiment, when the color-resists and the light shielding strips of the color filter substrate overlap in the respective areas each including the plurality of teeth-shaped structures with the distance between the tops of every two adjacent teeth-shaped structures being less than twenty times the thickness of the light shielding strips, an oriented rubbing process is performed where the average step difference from a non-overlap area to an overlap area or from the overlap areas to the non-overlap areas slowly varies, thus making rubbing uniform and alleviating the color-resist film layer from being broken in the overlap areas.

The teeth-shaped structures can be formed only on the sides of the light shielding strips or can be formed only on the edges of the color-resists or can be formed on both the sides of the light shielding strips and the sides of the color-resists. As can be appreciated, only the light shielding strips may be structured teeth-shaped or only the light color-resists may be structured teeth-shaped or both the light shielding strips and the light color-resists may be structured teeth-shaped. For the sake of a convenient description, the teeth-shaped structures will be described below taking the teeth-shaped light shielding strips as an example.

Figure 2:
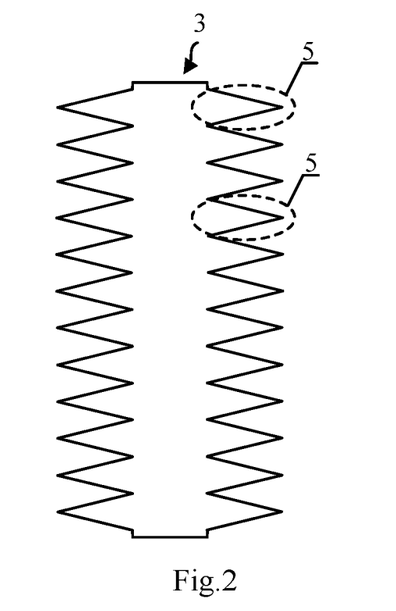
FIG. 2 illustrates a schematic structural diagram of a light shielding strip according to an embodiment of the present invention.

For example, a light shielding strip 3 illustrated in FIG. 2 includes a plurality of teeth-shaped structures 5 which are triangles with the apex angles being sharp angles, and the distance between the tops of every two adjacent teeth-shaped structures 5 is less than twenty times the thickness of the light shielding strip 3. In this case, the average thickness of the light shielding strip 3 slowly increases from the tops of the teeth-shaped structures 5 to the bottoms of the teeth-shaped structures 5. With the light shielding strip 3 overlapping with a color-resist, the teeth-shaped structures 5 are located in the area where the light shielding strip 3 overlaps with the color-resist so that while the color filter substrate being rubbed in the overlap area including the teeth-shaped structures 5, the average step difference from a non-overlap area to the overlap area slowly increases, and the average step difference from the overlap area to the non-overlap area slowly decreases, thus lowering a risk of the color-resist film layer being broken in the overlap area.

Figure 3:
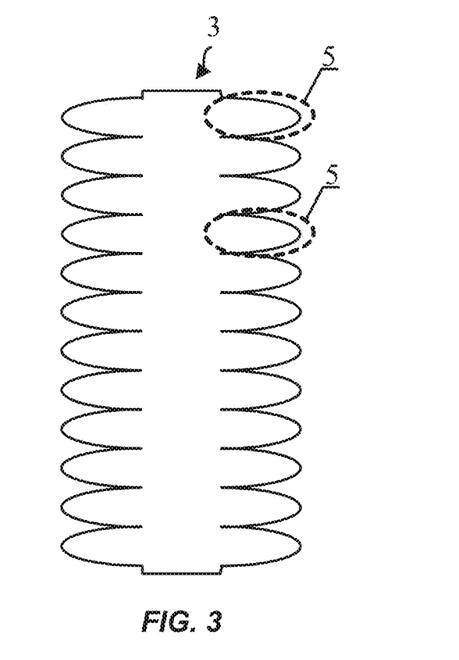
FIG. 3 illustrates a schematic structural diagram of another light shielding strip according to an embodiment of the present invention.

In another example, a light shielding strip 3 illustrated in FIG. 3 includes a plurality of teeth-shaped structures 5 which are triangles with the apex angles being arc-shaped, and the distance between the tops of every two adjacent teeth-shaped structures 5 is less than twenty times the thickness of the light shielding strip 3. In this case, the average thickness of the light shielding strip 3 increases slowly from the tops of the teeth-shaped structures 5 to the bottoms of the teeth-shaped structures 5. With the light shielding strip 3 overlapping with a color-resist, the teeth-shaped structures 5 are located in the area where the light shielding strip 3 overlaps with the color-resist so that while the color filter substrate is being rubbed in the overlap area including the teeth-shaped structures 5, the average step difference from a non-overlap area to the overlap area increases slowly, and the average step difference from the overlap area to the non-overlap area decreases slowly, thus lowering a risk of the color-resist film layer being broken in the overlap area. It shall be noted that in the light shielding strips 3 illustrated in FIG. 2 and FIG. 3, there are typically approximately arcs instead of perfect sharp tips available at the bottoms of the adjacent teeth-shaped structures 5 due to an insufficient resolution of patterning in real etching.

Figure 4:
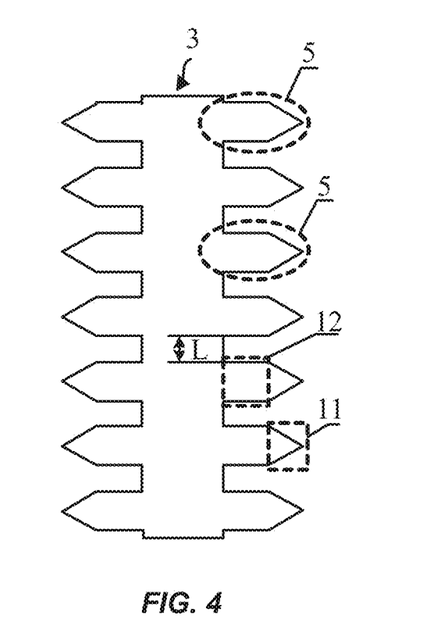
FIG. 4 illustrates a schematic structural diagram of another light shielding strip according to an embodiment of the present invention.

In still another example, a light shielding strip 3 illustrated in FIG. 4 includes a plurality of teeth-shaped structures 5 each including tips 11 and roots 12, and the distance between the tops of every two adjacent teeth-shaped structures 5 is less than twenty times the thickness of the light shielding strip 3. In this case, the average thickness of the light shielding strip 3 increases slowly from the tops of the teeth-shaped structures 5 to the bottoms of the teeth-shaped structures 5. With the light shielding strip 3 overlapping with a color-resist, the teeth-shaped structures 5 are located in the area where the light shielding strip 3 overlaps with the color-resist so that while the color filter substrate is being rubbed in the overlap area including the teeth-shaped structures 5, the average step difference from a non-overlap area to the overlap area increases slowly, and the average step difference from the overlap area to the non-overlap area decreases slowly, thus lowering a risk of the color-resist film layer being broken in the overlap area; and also a sufficient resolution of patterning being unavailable in an exposure, development or etching process due to a too short distance between the teeth-shaped structures 5 can be avoided since there is a preset distance L between the adjacent teeth-shaped structures 5. Optionally the tips 11 of the teeth-shaped structures 5 are isosceles triangles, the roots 12 of the teeth-shaped structures 5 are rectangles or trapezoid, and the sides of the root 12 and the tips 11 are connected to each other in each teeth-shaped structure 5 are equal in length.

The teeth-shaped structures are formed on the color-resists in a similar pattern to the teeth-shaped structures formed on the light shielding strips illustrated in FIG. 2 to FIG. 4 above such that an average step difference in an area where a color-resist and a light shielding strip of the color filter substrate overlap may also be conform to that the average step difference from a non-overlap area to the overlap area increases slowly, and the average step difference from the overlap area to the non-overlap area decreases slowly, thus lowering a risk of the color-resist film layer being broken in the overlap area.

When the teeth-shaped structures 5 in FIG. 2 to FIG. 4 are applied to a color-resist or a light shielding strip, there may be various overlap structures formed by the color-resist and the light shielding strip in the color filter substrate, and particular examples thereof will be described below.

Figure 5:
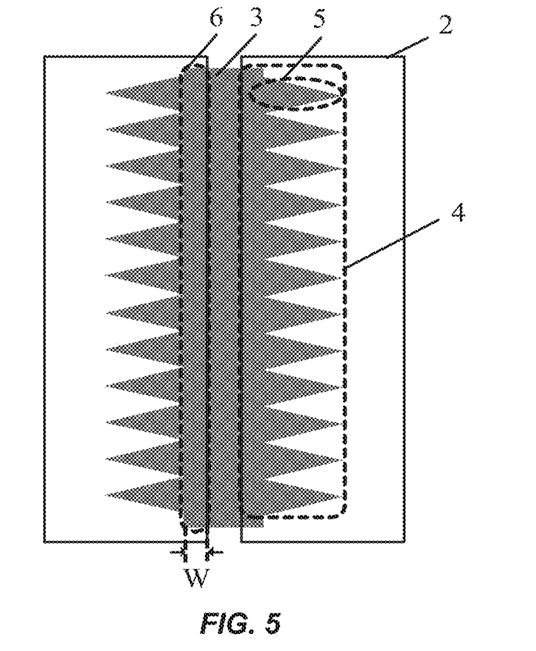
FIG. 5 illustrates a schematic diagram of a color filter substrate according to an embodiment of the present invention in a top view.

For example, FIG. 5 illustrates a schematic diagram of a color filter substrate in a top view including a color-resist 2, and a light shielding strip 3 overlapping with the color-resist 2 in an overlap area 4. There is a plurality of the teeth-shaped structures 5, as illustrated in FIG. 2, in the overlap area 4 formed on the sides of the light shielding strip 3, and the distance between the tops of every two adjacent teeth-shaped structures 5 is less than twenty times the thickness of the light shielding strip. Since the average thickness of the light shielding strip 3 increases slowly from the tops of the teeth-shaped structures 5 to the bottoms of the teeth-shaped structures 5 in the overlap area 4, and thus the average step difference of the color-resist 2 increases slowly from a non-overlap area to the overlap area 4, the color-resist film layer can be alleviated from being broken in the overlap area 4 while the color filter substrate is being rubbed. Also in order to guarantee that the edges of the color-resist 2 can be shielded by the light shielding strip 3 despite a potential alignment error in the manufacturing process, the color-resist 2 and the light shielding strip 3 shall further overlap by a shielding guaranteeing area 6 with the width of W, which can be defined as the difference between the width of the overlap area 4 and the height of the teeth-shaped structures 5 therein perpendicular to the direction where the color-resist 2 and the light shielding strip 3 extend, and which ranges from 0.5 to 3 µm.

Figure 6:
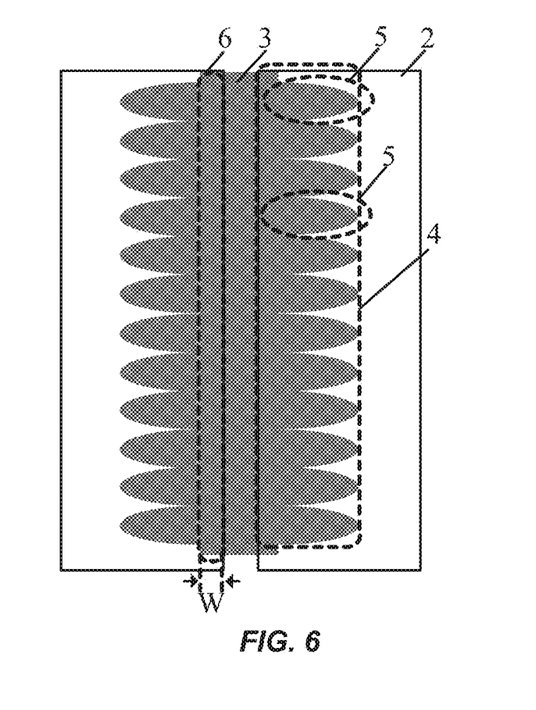
FIG. 6 illustrates a schematic diagram of another color filter substrate according to an embodiment of the present invention in a top view.

In another example, FIG. 6 illustrates a schematic diagram of another color filter substrate in a top view including a color-resist 2, and a light shielding strip 3 overlapping with the color-resist 2 in an overlap area 4. There is a plurality of the teeth-shaped structures 5, as illustrated in FIG. 3, in the overlap area 4 formed on the sides of the light shielding strip 3, and the distance between the tops of every two adjacent teeth-shaped structures 5 is less than twenty times the thickness of the light shielding strip. Since the average thickness of the light shielding strip 3 increases slowly from the tops of the teeth-shaped structures 5 to the bottoms of the teeth-shaped structures 5 in the overlap area 4, and thus the average step difference of the color-resist 2 increases slowly from a non-overlap area to the overlap area 4, the color-resist film layer can be alleviated from being broken in the overlap area 4 while the color filter substrate is being rubbed. Also in order to guarantee that the edges of the color-resist 2 can be shielded by the light shielding strip 3 despite a potential alignment error in the manufacturing process, the color-resist 2 and the light shielding strip 3 shall further overlap by a shielding guaranteeing area 6 with the width of W, which can be defined as the difference between the width of the overlap area 4 and the height of the teeth-shaped structures 5 therein perpendicular to the direction where the color-resist 2 and the light shielding strip 3 extend, and which ranges from 0.5 to 3 µm. It shall be noted that in the light shielding strips 3 illustrated in FIG. 5 and FIG. 6, there may be approximate arcs instead of perfect sharp tips available at the bottoms of the adjacent teeth-shaped structures 5 due to an insufficient resolution of patterning in real etching.

Figure 7:
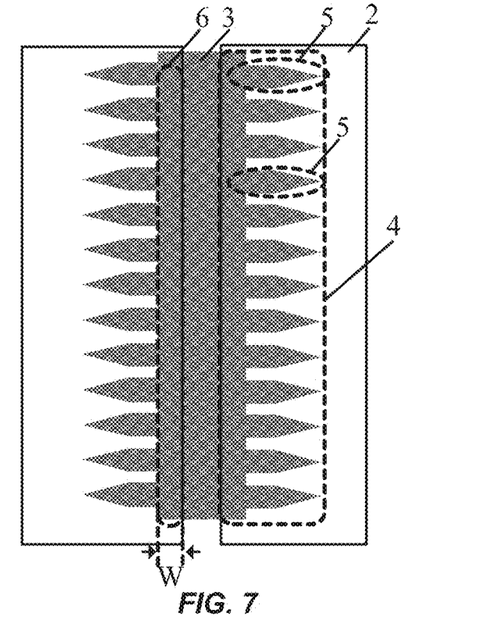
FIG. 7 illustrates a schematic diagram of another color filter substrate according to an embodiment of the present invention in a top view.

In still another example, FIG. 7 illustrates a schematic diagram of another color filter substrate in a top view including a color-resist 2, and a light shielding strip 3 overlapping with the color-resist 2 in an overlap area 4. There is a plurality of the teeth-shaped structures 5, as illustrated in FIG. 4, in the overlap area 4 formed on the sides of the light shielding strip 3, and the distance between the tops of every two adjacent teeth-shaped structures 5 is less than twenty times the thickness of the light shielding strip. Since the average thickness of the light shielding strip 3 increases slowly from the tops of the teeth-shaped structures 5 to the bottoms of the teeth-shaped structures 5 in the overlap area 4, and thus the average step difference of the color-resist 2 increases slowly from a non-overlap area to the overlap area 4, the color-resist film layer can be alleviated from being broken in the overlap area 4 while the color filter substrate is being rubbed. Also in order to guarantee that the edges of the color-resist 2 can be shielded by the light shielding strip 3 despite a potential alignment error in the manufacturing process, the color-resist 2 and the light shielding strip 3 shall further overlap by a shielding guaranteeing area 6 with the width of W, which can be defined as the difference between the width of the overlap area 4 and the height of the teeth-shaped structures 5 therein perpendicular to the direction where the color-resist 2 and the light shielding strip 3 extend, and which ranges from 0.5 to 3 µm.

Figure 8:
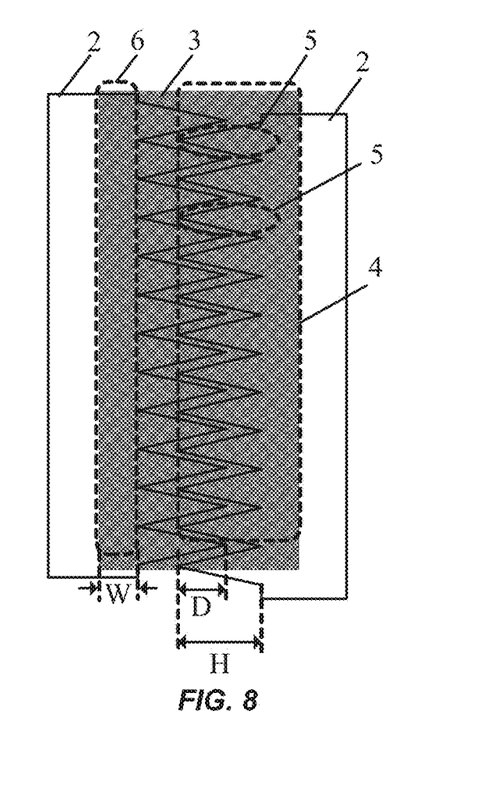
FIG. 8 illustrates a schematic diagram of another color filter substrate according to an embodiment of the present invention in a top view.

In still another example, FIG. 8 illustrates a schematic diagram of another color filter substrate in a top view including a color-resist 2, and a light shielding strip 3 overlapping with the color-resist 2 in an overlap area 4. There is a plurality of the teeth-shaped structures 5, as illustrated in FIG. 2, in the overlap area 4 formed on the sides of the color-resist 2, and the distance between the tops of every two adjacent teeth-shaped structures 5 is less than twenty times the thickness of the light shielding strip. Since the average thickness of the color-resist 2 increases slowly from the tops of the teeth-shaped structures 5 to the bottoms of the teeth-shaped structures 5 in the overlap area 4, and thus the average step difference of the color-resist 2 increases slowly from a non-overlap area to the overlap area 4, the color-resist film layer can be alleviated from being broken in the overlap area 4 while the color filter substrate is being rubbed. Also in order to guarantee that the teeth-shaped structures 5 on the sides of the color-resist 2 can be shielded by the light shielding strip 3 despite a potential alignment error in the manufacturing process, the color-resist 2 and the light shielding strip 3 shall further overlap by a shielding guaranteeing area 6 with the width of W, which can be defined as the difference between the width of the overlap area 4 and the height of the teeth-shaped structures 5 therein perpendicular to the direction where the color-resist 2 and the light shielding strip 3 extend, and which ranges from 0.5 to 3 µm. In this embodiment, the teeth-shaped structures 5 on the adjacent sides of two color-resists 2 overlapping with the same light shielding strip 3 are arranged in a staggered order and engaged into each other by a depth D less than or equal to the height H of the teeth-shaped structures 5 and optionally less than half the height H of the teeth-shaped structures 5.

In the light shielding strips 3 of the color filter substrate illustrated in FIG. 5 to FIG. 7 above, the teeth-shaped structures 5 on both sides of the light shielding strips 3 are arranged to have mirror symmetry with respect to the central axis in the direction where the light shielding strips 3 extend taken as the symmetry axis, and in order to enable the thickness of the entire light shielding strips 3 to be distributed more linearly smoothly, the teeth-shaped structures 5 on both sides of the light shielding strips 3 can be arranged to be in minor dissymmetry with respect to the central axis in the direction where the light shielding strips extend taken as the symmetry axis. Particular examples thereof will be described below.

Figure 9:
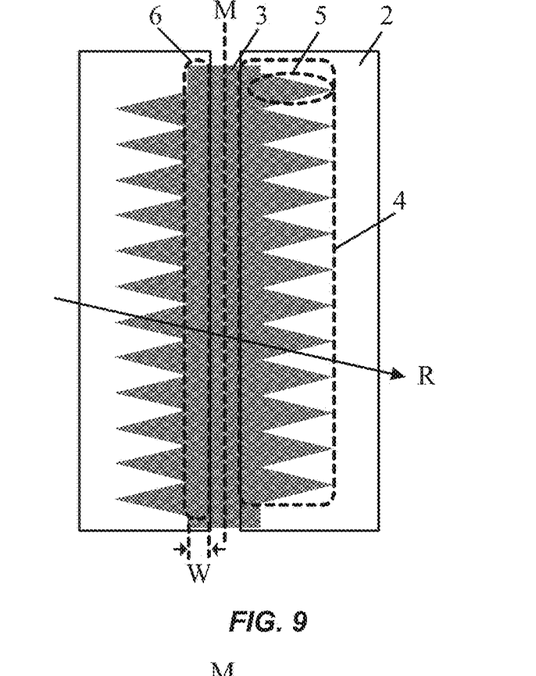
FIG. 9 illustrates a schematic diagram of another color filter substrate according to an embodiment of the present invention in a top view.

In still another example, FIG. 9 illustrates a schematic diagram of another color filter substrate in a top view including a color-resist 2, and a light shielding strip 3 overlapping with the color-resist 2 in an overlap area 4. There are a plurality of the teeth-shaped structures 5, as illustrated in FIG. 3, in the overlap area 4 formed on the sides of the light shielding strip 3, and the teeth-shaped structures 5 on both the sides of the light shielding strip 3 are arranged to be in minor dissymmetry with respect to the central axis M in the direction where the light shielding strip 3 extends taken as the symmetry axis, and the distance between the tops of every two adjacent teeth-shaped structures 5 on the same side is less than twenty times the thickness of the light shielding strip. More particularly the teeth-shaped structures 5 on both sides of the light shielding strip 3 will not coincide when being folded along the central axis M of the light shielding strip 3. Since the average thickness of the light shielding strip 3 increases slowly from the tops of the teeth-shaped structures 5 to the bottoms of the teeth-shaped structures 5 in the overlap area 4, and thus the average step difference of the color-resist 2 increases slowly from a non-overlap area to the overlap area 4, the color-resist film layer can be alleviated from being broken in the overlap area 4 while the color filter substrate is being rubbed; furthermore the teeth-shaped structures 5 on both sides of the light shielding strip 3 are arranged to be in mirror dissymmetry with respect to the central axis M in the direction where the light shielding strip 3 extends taken as the symmetry axis so that there will be a more satisfactory width and ideal strength of the light shielding strip 3 other than the teeth-shaped structures 5 than the light shielding strip 3 with the symmetric teeth-shaped structures 5, thus avoiding a risk of being broken; and still furthermore when the rubbing direction R is perpendicular to the central axis M or there is an angle of more than zero degrees between the rubbing direction and the central axis M, since the teeth-shaped structures 5 on both sides of the light shielding strip 3 are arranged to be in minor dissymmetry with respect to the central axis M in the direction where the light shielding strip 3 extends taken as the symmetry axis, the teeth-shaped structures 5 can be distributed more uniformly in the rubbing direction R, so that the step difference between the overlap area 4 as a whole and the non-overlap area can vary more smoothly, and also significantly varying differences in step difference between different locations in the overlap area 4 and the non-overlap area due to a varying thickness of the color-resist may be lowered. Also in order to guarantee that the edges of the color-resist 2 can be shielded by the light shielding strip 3 despite a potential alignment error in the manufacturing process, the color-resist 2 and the light shielding strip 3 shall further overlap by a shielding guaranteeing area 6 with the width of W, which can be defined as the difference between the width of the overlap area 4 and the height of the teeth-shaped structures 5 therein perpendicular to the direction where the color-resist 2 and the light shielding strip 3 extend, and which ranges from 0.5 to 3 μm.

The color filter substrate illustrated in FIG. 9 can be regarded as a variant of the color filter substrate illustrated in FIG. 5 and the similar variant of the color filter substrates illustrated in FIG. 6 and FIG. 7 can be performed in the same principle to improve the trend in thickness of the light shielding strips 3, where a repeated description thereof will be omitted here.

Figure 10:
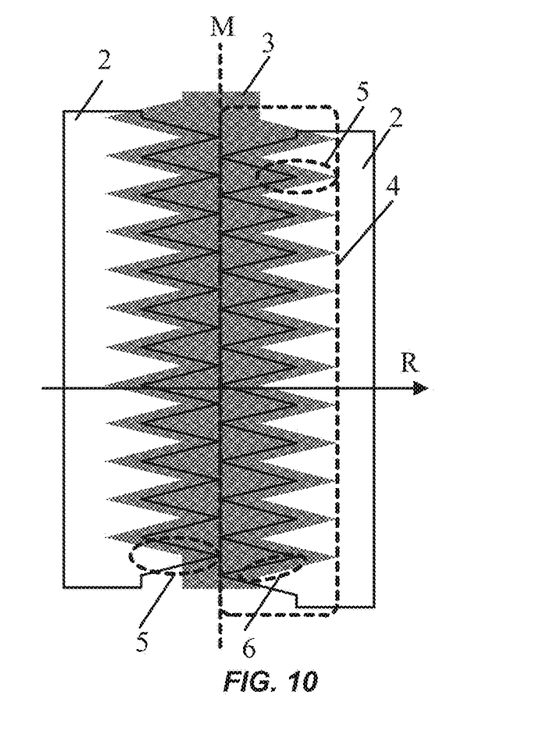
FIG. 10 illustrates a schematic diagram of another color filter substrate according to an embodiment of the present invention in a top view.
Figure 11:
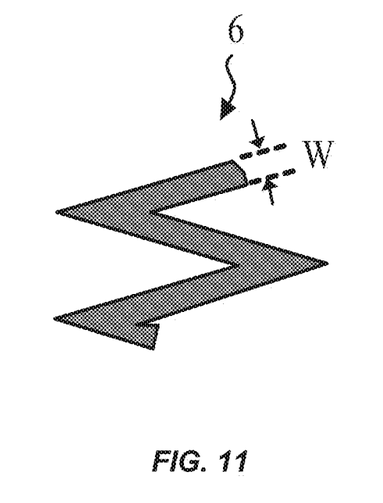
FIG. 11 illustrates a schematic diagram of a shielding guaranteeing area in the color filter substrate illustrated in FIG. 10 in a partially enlarged view.

In still another example, FIG. 10 illustrates a schematic diagram of another color filter substrate in a top view, which is a color filter substrate including a color-resist and a light shielding strip, to both of which the teeth-shaped structures 5 illustrated in FIG. 2 are applied. The color filter substrate includes a color-resist 2, and a light shielding strip 3 overlapping with the color-resist 2 in an overlap area 4. There are a plurality of the teeth-shaped structures 5, as illustrated in FIG. 3, in the overlap area 4 formed respectively on the sides of the color-resist 2 and the sides of the light shielding strip 3, and the teeth-shaped structures 5 on both the sides of the light shielding strip 3 are arranged to be in mirror dissymmetry with respect to the central axis in the direction where the light shielding strip 3 extends taken as the symmetry axis, and more particularly the teeth-shaped structures 5 on both sides of the light shielding strip 3 will not coincide when being folded along the central axis M of the light shielding strip 3. The distance between the tops of every two adjacent teeth-shaped structures 5 on the same side is less than twenty times the thickness of the light shielding strip. Since the average thickness of the light shielding strip 3 increases slowly from the tops of the teeth-shaped structures 5 to the bottoms of the teeth-shaped structures 5 in the overlap area 4, and thus the average step difference of the color-resist 2 increases slowly from a non-overlap area to the overlap area 4, the color-resist film layer can be alleviated from being broken in the overlap area 4 while the color filter substrate is being rubbed; furthermore the teeth-shaped structures 5 on both sides of the light shielding strip 3 are arranged to be in minor dissymmetry with respect to the central axis M in the direction where the light shielding strip 3 extends taken as the symmetry axis so that there will be a more satisfactory width and ideal strength of the light shielding strip 3 other than the teeth-shaped structures 5 than the light shielding strip 3 with the symmetric teeth-shaped structures 5, thus avoiding a risk of being broken; and still furthermore when the rubbing direction R is perpendicular to the central axis M or there is an angle of more than zero degrees between the rubbing direction and the central axis M, since the teeth-shaped structures 5 on both sides of the light shielding strip 3 are arranged to be in mirror dissymmetry with respect to the central axis M in the direction where the light shielding strip 3 extends taken as the symmetry axis, the teeth-shaped structures 5 can be distributed more uniformly in the rubbing direction R, so that the step difference between the overlap area 4 as a whole and the non-overlap area can vary more smoothly, and also significantly varying differences in step difference between different locations in the overlap area 4 and the non-overlap area due to a varying thickness of the color-resist may be lowered. Also in order to guarantee that the bottom of the teeth-shaped structures 5 on the sides of the color-resist 2 can be shielded by the light shielding strip 3 despite a potential alignment error in the manufacturing process, the color-resist 2 and the light shielding strip 3 shall further overlap by a shielding guaranteeing area 6. In a schematic diagram of a shielding guaranteeing area 6 in a partially enlarged view as illustrated in FIG. 11, the width W of the shielding guaranteeing area 6 can be defined as a section width of a strip-shaped stack layer formed by the teeth-shaped structures 5 of the color-resist 2 and the teeth-shaped structures 5 of the light shielding strip 3, and the width W of the shielding guaranteeing area 6 ranges from 0.5 to 3 μm.

The teeth-shaped structures 5 in the respective embodiments above are formed on the "sides" of the color-resist 2 and/or the light shielding strip 3, which can be both the sides of the light shielding strip 3 or one side of the color-resist 2 (the side thereof overlapping with the light shielding strip 3) as needed in practical application.

Figure 12:
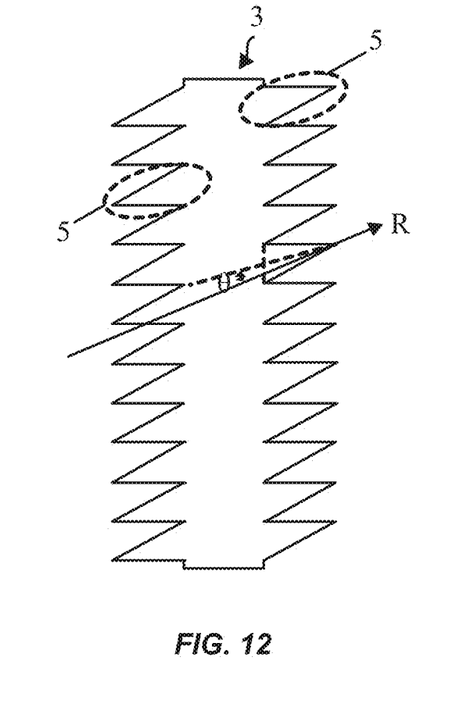
FIG. 12 illustrates a schematic diagram of a relationship between a light shielding strip and a rubbing direction according to an embodiment of the present invention.

In order to further alleviate a damage to the color-resist film layer during rubbing, the angle between a straight line and a rubbing direction of a color film substrate can be further made less than or equal to 10°, the straight line is from the acmes of the respective teeth-shaped structure 5 in the overlap area 4 where the color-resist 2 and the light shielding strip 3 overlap in the color film substrate above to the middle points of bottoms thereof. Referring to a light shielding strip 3 illustrated in FIG. 12, there is an angle θ less than or equal to 10° between a straight line and the direction R of the color film substrate, the straight line is from the acmes of the teeth-shaped structure 5 on both sides thereof to the middle points of bottoms thereof, and this design can maximally alleviate a damage due to rubbing to thereby avoid considerable chipping as a result of rubbing from occurring.

Advantageous effects of the respective embodiments above of the present invention are as follows: when the color-resists and the light shielding strips of the color filter substrate overlap in the respective areas each including the plurality of teeth-shaped structures with the distance between the tops of every two adjacent teeth-shaped structures being less than twenty times the thickness of the light shielding strips, the average step difference from a non-overlap area to an overlap area or from the overlap areas to the non-overlap areas varies slowly during an oriented rubbing process, thus making rubbing uniform and alleviating the color-resist film layer from being broken in the overlap areas; and further the brightness of display on the display device can be made uniform to thereby improve the quality of display thereof.

Figure 13:
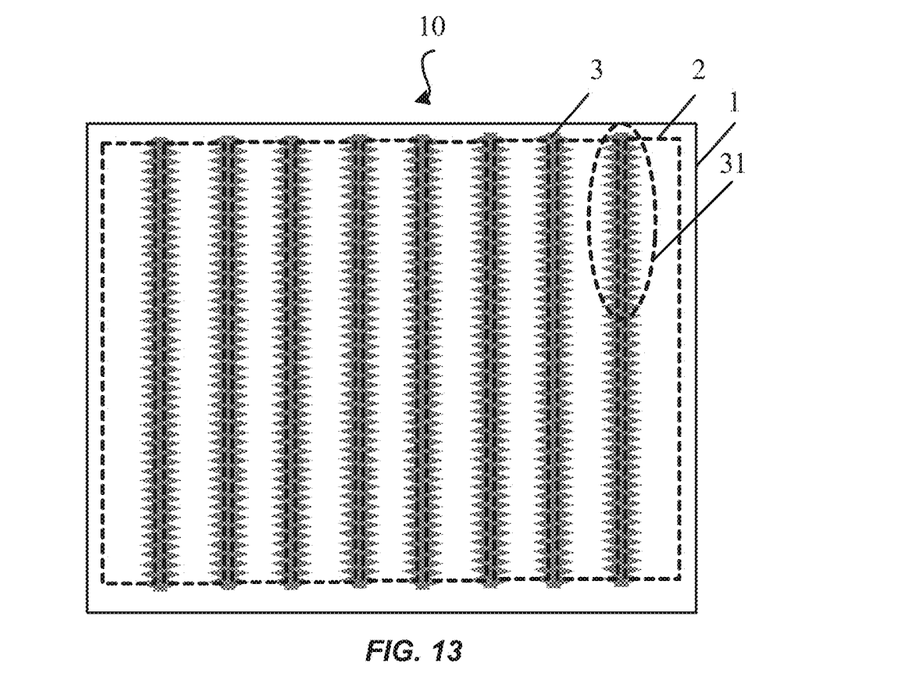
FIG. 13 illustrates a schematic diagram of a liquid crystal display panel according to an embodiment of the present invention.

Referring to FIG. 13, a liquid crystal display panel 10 according to an embodiment of the present invention is provided, which includes the color filter substrate according to any one of the embodiments above, an opposite substrate (not illustrated), and a liquid crystal layer (not illustrated) between the color filter substrate and the opposite substrate, and the color filter substrate includes a base substrate 1 and color-resists 2, and light shielding strips 3, formed sequentially on the base substrate 1. It shall be noted that for the liquid crystal display panel 10, the base substrate 1 is arranged proximate to the visible side of the liquid crystal display panel 10, and the color-resists 2 and the light shielding strips 3 are arranged on the side of the base substrate 1 facing a liquid crystal layer, so the color-resists 2 are illustrated in dotted lines. In this embodiment, the color-resists 2 and the light shielding strips 3 are illustrated as being arranged on the liquid crystal display panel 10 in the column direction, but they can alternatively be arranged in the row direction or in both the row direction and the column direction, and the embodiment of the present invention will not be limited thereto.

Figure 14:
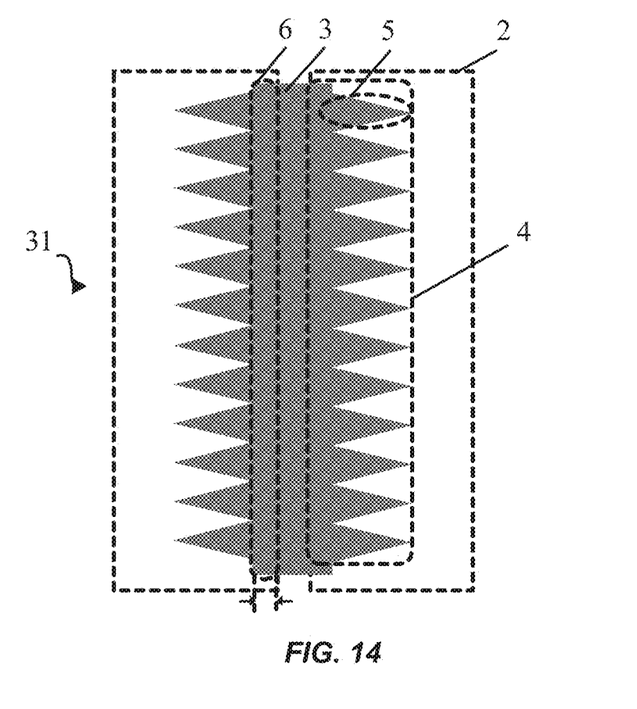
FIG. 14 illustrates a schematic diagram of an area where a light shielding strip overlaps with a color-resist according to an embodiment of the present invention in a partially enlarged view.

For the sake of clarity the area where the light shielding strip 3 and the color-resist 2 overlap, the schematic enlarged diagram of the portion thereof at the dotted line 31 illustrated in FIG. 14 (a schematic diagram of the area where the light shielding strip 3 and the color-resist 2 overlap in a partially enlarged view) will be described as an example: the light shielding strip 3 and the color-resist 2 overlap in the overlap area 4. There is a plurality of the teeth-shaped structures 5, as illustrated in FIG. 2, in the overlap area 4 formed on the sides of the light shielding strip 3, and the distance between the tops of every two adjacent teeth-shaped structures 5 is less than twenty times the thickness of the light shielding strip. Since the average thickness of the light shielding strip 3 increases slowly from the tops of the teeth-shaped structures 5 to the bottoms of the teeth-shaped structures 5 in the overlap area 4, and thus the average step difference of the color-resist 2 increases slowly from a non-overlap area to the overlap area 4, the color-resist film layer can be alleviated from being broken in the overlap area 4 while the color filter substrate is being rubbed. Also in order to guarantee that the edges of the color-resist 2 can be shielded by the light shielding strip 3 despite a potential alignment error in the manufacturing process, the color-resist 2 and the light shielding strip 3 shall further overlap by a shielding guaranteeing area 6 with the width of W, which can be defined as the difference between the width of the overlap area 4 and the height of the teeth-shaped structures 5 therein perpendicular to the direction where the color-resist 2 and the light shielding strip 3 extend, and which ranges from 0.5 to 3 µm. The overlap structure formed by the light shielding strip 3 and the color-resist 2 as illustrated in the schematic enlargement diagram drawn in the dotted line 31 can be implemented as the overlap structure formed by the light shielding strip 3 and the color-resist 2 in the color filter substrate as illustrated in FIG. 5 or of course can be implemented as the overlap structure formed by the light shielding strip 3 and the color-resist 2 in the color filter substrate as illustrated in any one of FIG. 6 to FIG. 10, and in the meantime the liquid crystal display panel can further include an array substrate, a liquid crystal layer, etc., shielded by the color filter substrate, where a repeated description thereof will be omitted here.

Advantageous effects of the embodiment of the present invention are as follows: when the color-resists and the light shielding strips of the color filter substrate overlap in the respective areas each including the plurality of teeth-shaped structures with the distance between the tops of every two adjacent teeth-shaped structures being less than twenty times the thickness of the light shielding strips, the average step difference from a non-overlap area to an overlap area or from the overlap areas to the non-overlap areas varies slowly during an oriented rubbing process, thus making rubbing uniform and alleviating the color-resist film layer from being broken in the overlap areas; and further the brightness of display on the display device can be made uniform to thereby improve the quality of display thereof.

Figure 15:
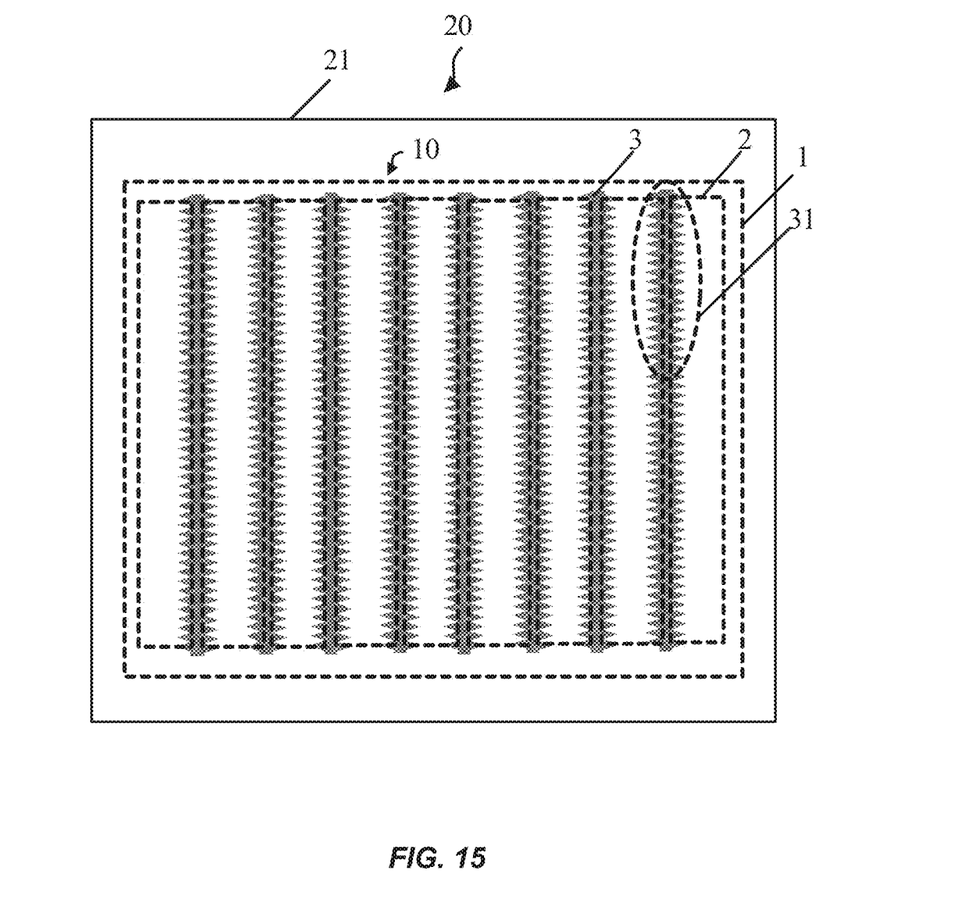
FIG. 15 illustrates a schematic diagram of a display device according to an embodiment of the present invention.

Referring to FIG. 15, a display device twenty according to an embodiment of the present invention is provided, which includes a frame 21 and the liquid crystal display panel 10 according to the embodiment above, where the liquid crystal display panel 10 includes the color filter substrate according to any one of the embodiments above, an opposite substrate (not illustrated), and a liquid crystal layer (not illustrated) between the color filter substrate and the opposite substrate. The color filter substrate includes a base substrate 1, and color-resists 2, and light shielding strips 3, formed sequentially on the base substrate 1. It shall be noted that for the liquid crystal display panel 10, the base substrate 1 is arranged proximate to the visible side of the liquid crystal display panel 10, and the color-resists 2 and the light shielding strips 3 are arranged on the side of the base substrate 1 facing a liquid crystal layer, so the base substrate 11 and the color-resists 2 are illustrated in dotted lines. FIG. 14 illustrates a schematic enlarged diagram of the portion drawn in the dotted line 31 illustrated in FIG. 15, where a repeated description thereof will be omitted here.

Advantageous effects of the embodiment of the present invention are as follows: when the color-resists and the light shielding strips of the color filter substrate overlap in the respective areas each including the plurality of teeth-shaped structures with the distance between the tops of every two adjacent teeth-shaped structures being less than twenty times the thickness of the light shielding strips, the average step difference from a non-overlap area to an overlap area or from the overlap areas to the non-overlap areas varies slowly during an oriented rubbing process, thus making rubbing uniform and alleviating the color-resist film layer from being broken in the overlap areas; and further the brightness of display on the display device can be made uniform to thereby improve the quality of display thereof.

Those of skilled in the art can make various modifications and variations to the present invention without departing from the spirit and scope of the present invention. Thus the present invention is also intended to encompass these modifications and variations thereto so long as the modifications and variations come into the scope of the claims appended to the present invention and their equivalents.

What is claimed is:

1. A color filter substrate, comprising: a plurality of color-resists arranged with gaps in between the color-resists; a plurality of light shielding strips arranged in the gaps between every two adjacent color-resists, wherein the plurality of color-resists and the plurality of light shielding strips overlap in respective overlap areas; and a plurality of teeth-shaped structures are formed only on the opposing sides of the color-resists, the respective teeth-shaped structures on corresponding sides of immediately adjacent color-resists are arranged in a staggered order and engage each other by a depth less than or equal to the height of the teeth-shaped structures; wherein a distance between two adjacent tooth tips in each said teeth-shaped structure is less than twenty times a thickness of the light shielding strips, wherein a difference between a width of the overlap areas and a height of the teeth-shaped structures therein along a direction perpendicular to a direction where the color-resists and the light shielding strips extend is larger than or equal to 0.5 μm and less than or equal to 3 μm.

2. The color filter substrate according to claim 1, wherein a pattern of the teeth-shaped structures is an arc, or is a triangle with an apex angle being a sharp angle.

3. The color filter substrate according to claim 2, wherein the teeth-shaped structures are formed respectively on opposing sides of the light shielding strips and the color-resists, and the respective teeth-shaped structures located respectively on opposing sides of the light shielding strips are arranged to be in mirror dissymmetry with respect to a central axis in a direction where the light shielding strips extend as the symmetry axis.

4. The color filter substrate according to claim 3, wherein a section width of a strip-shaped stack layer formed by the teeth-shaped structures of the color-resist and the teeth-shaped structures of the light shielding strip in a same one of the overlap areas is larger than or equal to 0.5 μm and less than or equal to 3 μm.

5. The color filter substrate according to claim 1, wherein the teeth-shaped structure comprises a tip and a root, and the tip of the teeth-shaped structure is a triangle with an apex angle being a sharp angle, or a pattern of the tip of the teeth-shaped structure is an arc, and the root of the teeth-shaped structure is a rectangle or a trapezoid.

6. The color filter substrate according to claim 5, wherein the pattern of the root of the teeth-shaped structure is a rectangle, the pattern of the tip of the teeth-shaped structure is an isosceles triangle, sides of the root and the tip connected to each other in the teeth-shaped structure are equal in length, and there is a preset distance between roots of two adjacent ones of the teeth-shaped structures.

7. The color filter substrate according to claim 1, wherein the teeth-shaped structures are formed only on sides of the light shielding strips; or the teeth-shaped structures are formed only on sides of the color-resists.

8. The color filter substrate according to claim 7, wherein the teeth-shaped structures are formed only on the sides of the light shielding strips, and wherein the respective teeth-shaped structures located respectively on opposing sides of the light shielding strips are arranged to be in mirror dissymmetry with respect to a central axis in the direction where the light shielding strips extend as the symmetry axis.

9. The color filter substrate according to claim 1, wherein the teeth-shaped structures are engaged into each other by the depth less than or equal to half the height of the teeth-shaped structures.

10. The color filter substrate according to claim 1, wherein an angle between a straight line and a rubbing direction of the color film substrate is less than or equal to 10°, the straight line extends from an acme of a teeth-shaped structure to a midpoint of a bottom side of the teeth-shaped structures.

11. A liquid crystal display panel, comprising a color filter substrate, wherein the color filter substrate comprises: a plurality of color-resists arranged with gaps in between the color-resists; a plurality of light shielding strips arranged in the gaps between every two adjacent color-resists, wherein the plurality of color-resists and the plurality of light shielding strips overlap in respective overlap areas; and a plurality of teeth-shaped structures are formed only on the opposing sides of the color-resists, the respective teeth-shaped structures on corresponding sides of immediately adjacent color-resists are arranged in a staggered order and engage each other by a depth less than or equal to the height of the teeth-shaped structures; wherein a distance between two adjacent tooth tips in each said teeth-shaped structure is less than twenty times a thickness of the light shielding strips, wherein a difference between a width of the overlap areas and a height of the teeth-shaped structures therein along a direction perpendicular to a direction where the color-resists and the light shielding strips extend is larger than or equal to 0.5 μm and less than or equal to 3 μm.

12. A display device, comprising a liquid crystal display panel, wherein the liquid crystal display panel comprises a color filter substrate, wherein the color filter substrate comprises: a plurality of color-resists arranged with gaps in between the color-resists; a plurality of light shielding strips arranged in the gaps between every two adjacent color-resists, wherein the plurality of color-resists and the plurality of light shielding strips overlap in respective overlap areas; and a plurality of teeth-shaped structures are formed only on the opposing sides of the color-resists, the respective teeth-shaped structures on corresponding sides of immediately adjacent color-resists are arranged in a staggered order and engage each other by a depth less than or equal to the height of the teeth-shaped structures; wherein a distance between two adjacent tooth tips in each said teeth-shaped structure is less than twenty times a thickness of the light shielding strips, wherein a difference between a width of the overlap areas and a height of the teeth-shaped structures therein along a direction perpendicular to a direction where the color-resists and the light shielding strips extend is larger than or equal to 0.5 μm and less than or equal to 3 μm.

* * * * *